(No Model.)

S. A. LEWIS.
ANIMAL TRAP.

No. 584,226.  Patented June 8, 1897.

Witnesses:
L. C. Hills.
A. L. Hough.

Inventor:
S. A. Lewis,
by Franklin H. Hough
Atty

UNITED STATES PATENT OFFICE.

SIMON ADOLPHUS LEWIS, OF HALLSBOROUGH, NORTH CAROLINA.

ANIMAL-TRAP.

SPECIFICATION forming part of Letters Patent No. 584,226, dated June 8, 1897.

Application filed February 16, 1897. Serial No. 623,645. (No model.)

*To all whom it may concern:*

Be it known that I, SIMON ADOLPHUS LEWIS, a citizen of the United States, residing at Hallsborough, in the county of Columbus and State of North Carolina, have invented certain new and useful Improvements in Animal-Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in traps, and especially to an animal-trap by which it will be possible to capture the animal by means of impaling the foot of the victim as it reaches after the bait, which has been previously set beneath the impaling-points in a hole which has been bored into a log or other suitable place.

The invention consists, further, in the provision of a trap of this character consisting of two jaws which are to be pivoted together and provided with pins downwardly and inwardly inclined, the said jaws being designed to be anchored to the adjacent edges of a hole which has been previously bored into a log, with the points extending down into the hole, and so arranged that the points will be drawn together as the victim puts its paw down past the points to secure the bait and attempts to withdraw the same and impale the animal.

To these ends and to such others as the invention may pertain, the same consists, further, in the novel construction, combination, and adaptation of the parts, as will be hereinafter more fully described and then specifically defined in the appended claim.

I clearly illustrate my invention in the accompanying drawings, which, with the letters of reference marked thereon, form a part of this specification, and in which drawings similar letters of reference indicate like parts throughout both views, in which—

Figure 1:
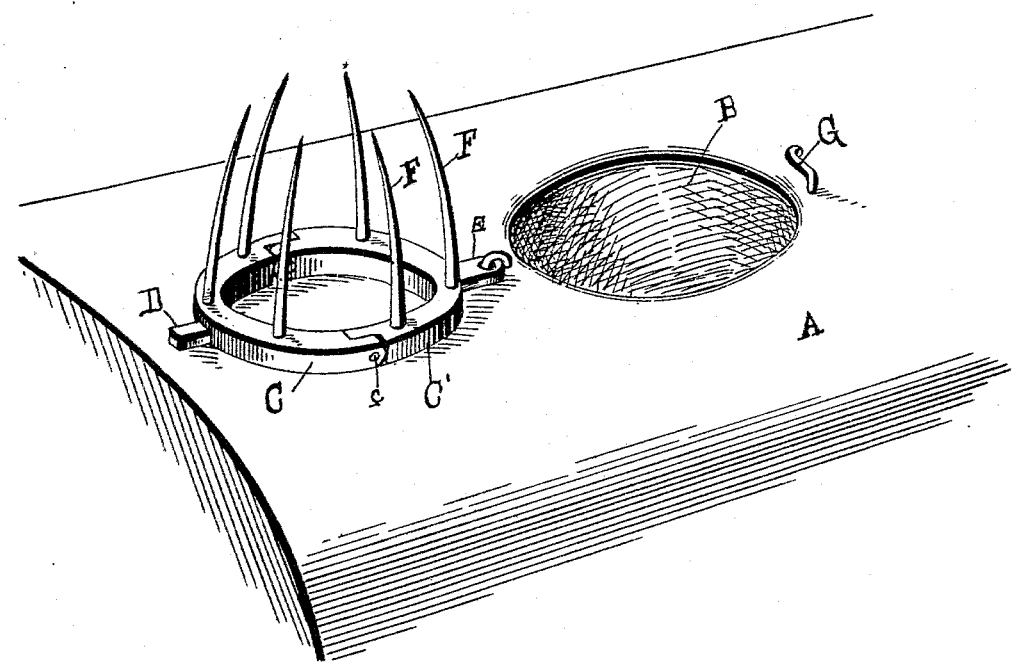
Figure 2:
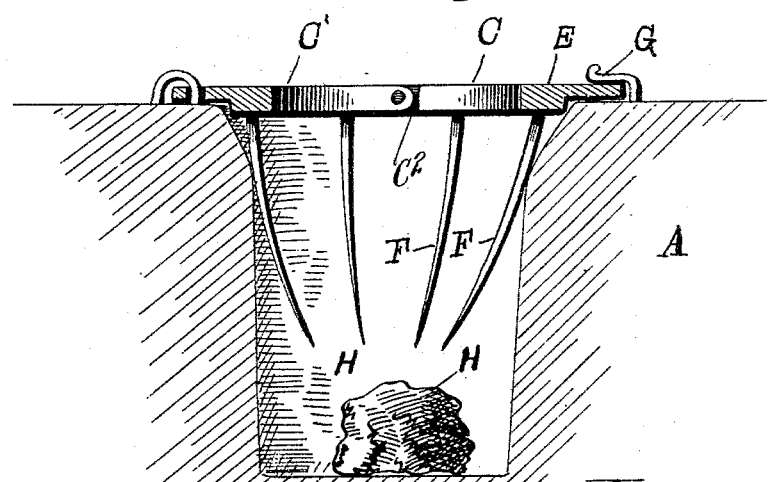

Figure 1 is a perspective view of my improved trap, shown as secured on one edge of the hole in the log, open. Fig. 2 is a central vertical section through the trap as applied to the log or in a set relation.

Reference now being had to the details of the drawings by letter, A designates a log of wood in which a hole B has been bored, in which the bait H is placed.

The jaws C and C' of the trap are pivoted together at $c$, and the jaw C' is provided with a lug E, which is apertured, and by means of which the jaw is stapled to the log. The jaw C has a lug D, which is designed to engage under the retaining-catch G on the opposite side of the hole.

F F are impaling-pins, which are secured to the under side of the jaws and are inwardly turned and extend down in the hole when the trap is set for use, with their points a slight distance above the bait. At $C^2$ the pivoted edges of the jaws are cut away, so as to allow the jaws to readily bend upward after the animal's foot has been inserted in the trap, so that the points will engage with the foot more readily and hold the victim. By this construction the animal's foot will be, together with its entire leg, so far down and out of reach that the animal cannot get at its leg with its mouth to aid itself in extricating the foot from the trap.

Having thus described my invention, what I claim to be new, and desire to secure by Letters Patent, is—

In an animal-trap, the combination with the log the jaws C and C' pivoted together with a portion of one of the jaws $C^2$ cut away, of the impaling-points F inwardly bent, and adapted to draw together as the pivoted portions of the jaws are raised up, substantially as shown and described.

In testimony whereof I affix my signature in presence of two witnesses.

SIMON ADOLPHUS LEWIS.

Witnesses:
LEE FONNY DUVAL,
HENRY LENNON.